Aug. 5, 1969    C. PRIJN    3,459,933
FLASH LAMP HOLDER FOR USE WITH A CAMERA
Filed Nov. 30, 1966    2 Sheets-Sheet 1

INVENTOR.
CORNELIS PRIJN
BY
AGENT

Aug. 5, 1969  C. PRIJN  3,459,933

FLASH LAMP HOLDER FOR USE WITH A CAMERA

Filed Nov. 30, 1966  2 Sheets-Sheet 2

INVENTOR.
CORNELIS PRIJN
BY
AGENT

United States Patent Office
3,459,933
Patented Aug. 5, 1969

3,459,933
FLASH LAMP HOLDER FOR USE WITH A CAMERA
Cornelis Prijn, Emmasingel, Eindhoven, Netherlands, assignor to U.S. Philips Corporation, New York, N.Y., a corporation of Delaware
Filed Nov. 30, 1966, Ser. No. 597,969
Claims priority, application Netherlands, Nov. 30, 1965, 6515520
Int. Cl. G03b 15/05
U.S. Cl. 240—1.3                     8 Claims

ABSTRACT OF THE DISCLOSURE

A device for holding a plurality of flash lamps is rotatably secured to a camera for successive firing of the lamps. The device has radial slots, and an annular member with recesses, the member being rotatable to a first position where its recesses are aligned with the slots permitting insertion of the lamps, or to a second position where the recesses and slots are unaligned for locking the lamps in the slots. Electrical connection means are provided for successively firing the lamps.

---

A prior art flash lamp holder has the form of a cube-shaped unit adapted to be secured to the upper side of a camera, and is designed so that by operation of the shutter mechanism, the relevant unit is rotated automatically and rapidly by a quarter revolution so that the next lamp reaches the flashing position. After the four flash lamps have been used, the unit is unserviceable and is thrown away. The portion of the holder of the known unit to be thrown away is comparatively expensive, generally comprising a base portion, four reflectors and a cube-shaped cover which are further unserviceable.

The invention has for its object to provide a combination which is suitable for use in a camera of the aforementioned type and which, while maintaining the flashing properties of the known combination, moreover provides the possibility of replacing the used flash lamps by new ones, so that the holder of the combination can be utilized again.

The combination is accordance with the invention is characterized in that the base portion has a plurality of grooves or slots extending from the outer circumference to the interior, into each groove a lamp is removably inserted. In or near each groove in the base portion, there is provided a set of resilient clamping contacts which are connected to receive current from the camera, and which are in contact with the current conductors protruding from a lamp in this groove. Consequently, the base portion has a plurality of grooves for receiving the flash lamps and an equal number of associated sets of separate resilient clamping contacts which are in contact with the current conductors protruding from the flash lamps.

It should be noted that it is known per se to provide a camera with a rotatable magazine comprising a number of reflectors and an equal number of grooves for receiving a number of flash lamps. However, the rotatable magazine is accommodated in a separate non-rotatable housing to be secured on the camera, which housing includes one set of stationary contacts which are connected with flashing contacts of the camera. The current conductors protruding from the lamps contact the set of stationary contacts of the housing only after reaching the flashing position.

The invention also relates to a holder which is particularly suitable for use in a combination of the aforesaid kind, and which is characterized in that the base portion has a plurality of grooves extending from the outer circumference to the interior, into each of which grooves a lamp can be slipped. In or near each groove in the base portion there is provided a set of resilient clamping contacts which are connected with the current-conducting contacts and which are in contact with the current conductors protruding from a lamp to be inserted in the groove.

In an embodiment of this holder, the set of resilient clamping contacts provided in or near each groove has the form of a set of resilient tongues which are electrically insulated from each other, and which extend mainly in the longitudinal direction of the groove at least along the part of their length at which they co-operate with the current conductors of a lamp in the groove. Thus, the height of the base portion may be chosen to be small, while nevertheless a tight clamping of the cap portion of each flash lamp in the groove is obtained. With a suitable shape of the tongues, the same holder may be used for lamp caps of various dimensions.

In a further embodiment of the holder in accordance with the invention, the side walls of each groove take the form of resilient tongues electrically insulated from each other. If desired, even the whole groove may be constituted by resilient tongues.

In another embodiment of the holder in accordance with the invention, the part of the cross-section of each groove facing the reflectors has a contraction of reduced width. This embodiment is particularly suitable for use as a holder for flash lamps having at one of their ends a flat pinch from which rectangularly bent current conductors protrude. Such lamps can be slipped by the thinnest portion of their pinches into the narrowest part of the cross-section of the groove. Consequently, a flash lamp thus arranged in a groove is locked in the direction of height.

In another embodiment of the holder, an annular member is adapted to rotate around the base portion into the periphery of which the grooves merge, which annular member is locally provided with recesses which in given positions correspond with the openings of the grooves. By means of this annular member, the lamps slipped into the grooves can be locked against being pushed laterally out of the grooves. This is of particular importance for a holder intended for use in cameras of the aforementioned type and which is rotated very rapidly; without this lateral locking, in this type of cameras the lamps provided in the holder are pushed out of their grooves upon rotation of the holder due to centrifugal forces produced. The invention further provides an embodiment which includes an ejector for removing from the grooves the lamps to be arranged in the holder.

If desired, a cover may be detachably provided on the base portion. This protecting cover is preferably blue-coloured so that a holder of this construction may be used in combination with bright-lacquered flash lamps; the blue-coloured cover constitutes a filter for the light emitted by the bright-lacquered flash lamp and reflected by the associated reflector.

The invention will now be described more fully with reference to a few embodiments shown in the drawing, in which.

Figures 1, 2:
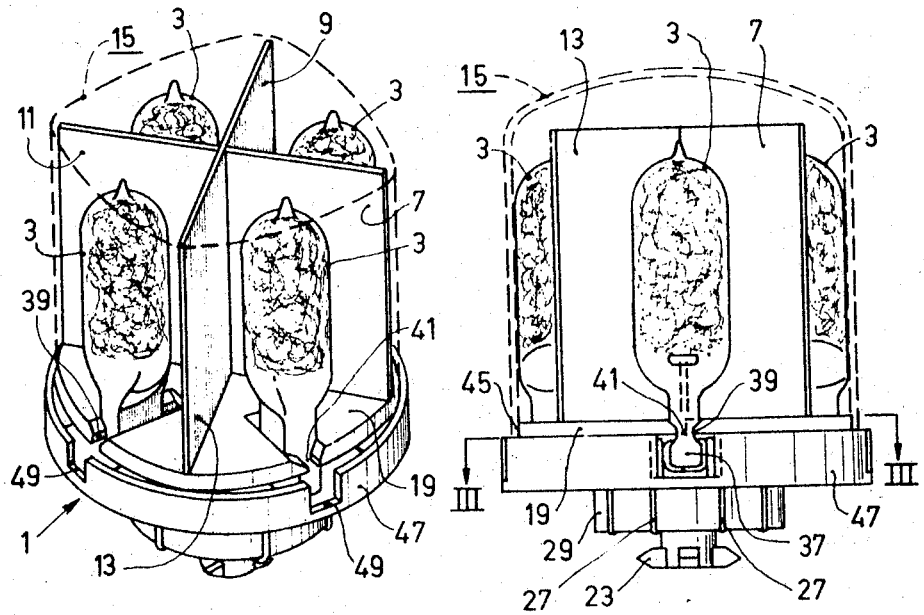
FIG. 1 is a perspective view of one embodiment of the invention.
FIG. 2 is a front elevation thereof.

The embodiment shown in FIGS. 1 and 2 includes a holder having a plurality of detachably arranged flash lamps 3. The holder comprises a base portion 1, four metal reflector walls 7, 9, 11, 13, and a transparent cube-shaped cover of synthetic substance which is shown in dotted lines and which is designated by 15.

Figure 3:
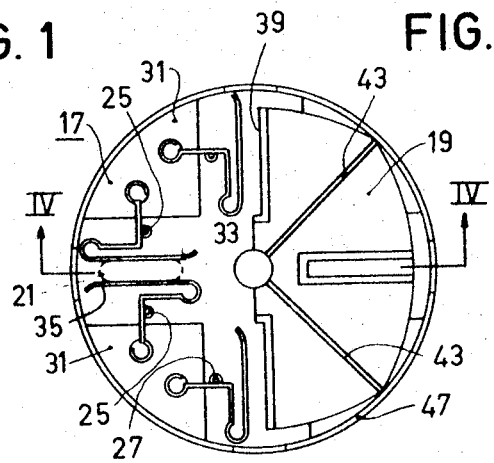
FIG. 3 is a sectional view of the base portion thereof taken on the line III—III of FIG. 2.
Figure 4:
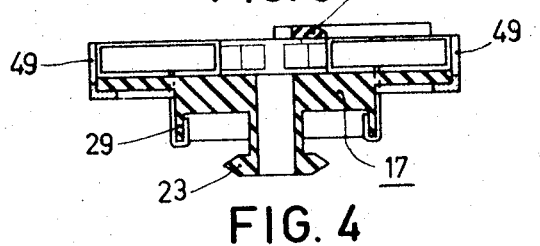
FIG. 4 is a sectional view taken on the line IV—IV of FIG. 3.

The base portion (cf. also FIGS. 3 and 4) comprising a base 17 pressed out of synthetic substance, and a covering plate 19 secured to its upper side, has a number of radial groove or slots 21 into each of which a flash lamp can be slipped. The lower side of the base 17 is further provided with a star-shaped member 23 by means of which the holder with the flash lamps 3 can be secured to a camera. This camera is designed so that after operating the shutter mechanism, the holder is rapidly rotated. A number of sets of current-conducting contacts 25 and 27 are grouped around the member 23 which extend along the upright wall of the collar 29 of the base 17. The relevant camera is further designed so that each time only one set of contacts of a holder is in contact with a set of stationary flashing contacts of this camera.

During the manufacture of the base 17, resilient clamping contacts are secured in its parts 31, which contacts are constituted in this case by a number of sets of resilient tongues 33 and 35, and these tongues are electrically connected with the aforementioned current-conducting contacts 25, 27. The tongues 33 and 35 form the upright side walls of the groove 21, and they are formed so that a flash lamp can be readily slipped by its cap portion 37 between the tongues.

The covering plate 19 is provided with a number of narrower grooves 39 each of which forms a contraction of the cross-section of the groove 21 shown in FIG. 2. In the manner shown, each of these narrower grooves 39 may receive the thinnest portion 41 of the pinch of a flash lamp 3, and a lamp slipped into the groove is then locked in the direction of height. The covering plate 19 is further provided with a number of shallow grooves 43 for receiving the lower edges of the reflector walls 7, 9, 11 and 13. These reflector walls received by the grooves are further held in place by the transparent cover 15 to be detachably clamped around the upper edge 45 of the plate 19.

A ring 47 provided with a number of recesses 49 is adapted to rotate about the round part of the base portion. This ring can be rotated between two positions. (1) where the recesses 49 correspond with the grooves 21 and the flash lamps can be slipped into the grooves, and (2) where recesses are unaligned with the grooves such that the flash lamps are locked against being laterally pushed out of the grooves.

Figure 5:
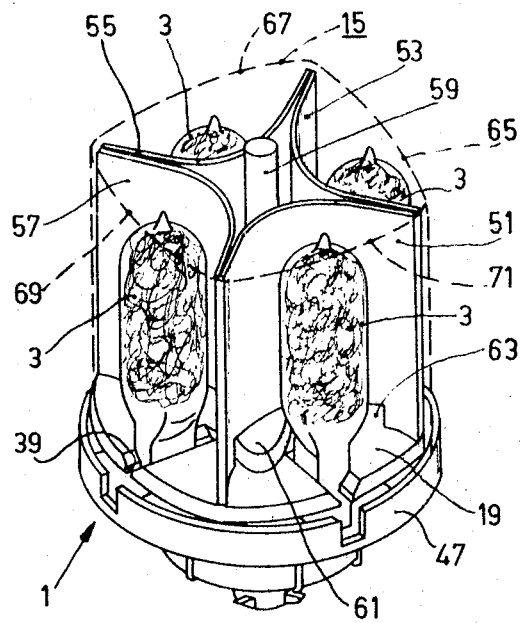
FIG. 5 is a perspective view of another embodiment of the invention.
Figure 6:
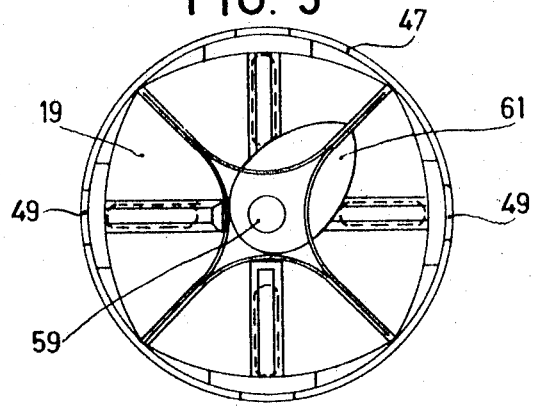
FIG. 6 is a plan view of the embodiment in FIG. 5.

In the embodiment shown in FIGS. 5 and 6, the reflectors take the form of curved partitions 51, 53, 55 and 57, and a pin 59 is rotatably provided between the partitions. The lower end of this pin 59 has secured to it a flat disc 61 which is normally located between two adjacent flash lamps. The partitions are provided at their lower sides with recesses 63 in which the flat disc 61 is displaceable. Thus, the possibility is obtained of pushing the used flash lamps out of the grooves in order of succession by rotation of the pin. The holder for the flash lamps can then be reused.

The flash lamps used in the holder described have a pinch from which rectangularly bent current conductors protrude. The locking means in the lateral direction and in the direction of height are provided in these embodiments for this type of flash lamp. It should be appreciated that the grooves, the tongues and the locking means for flash lamps having at their bulb-shaped part a flattened neck must be constructed slightly differently. In this case, the resilient tongues may have a form such that a flash lamp provided between the tongues is locked both in the direction of height and in lateral direction only by the spring action of the tongues. A separate covering plate 19 is then superfluous.

The detachable cover to be used in the holder structures described preferably has an opaque upper surface in order to prevent flash-light from being emitted upwards. The side faces 65, 67, 69, 71 of the cube-shaped cover are preferably blue-coloured so that use may be made of bright-lacquered flashlight lamps. The flash-light reflected by the reflectors then passes a blue window forming a filter for the flash-light emitted by the bright-lacquered flash lamp.

The ejector shown in FIG. 6 has only one disc-shaped part 61. If desired, this pin may have four of such parts 61 so that the used flash lamps can be simultaneously removed from their grooves.

What is claimed is:

1. A device for holding a plurality of flash lamps and being attachable to a camera for rotation thereon and successive firing of the lamps, the device including a reflector adjacent each lamp and connection means for electrically energizing the lamps, the improvement in combination therewith comprising:
    (a) a base having spaced slots extending radially inward from the outer circumference, the slots having width corresponding to that of the lamps which are thus insertible therein and are subsequently removable after firing to render the base re-usable, and
    (b) an annular member rotatably mounted to the base with its inner edge adjacent the base's circumferential edge, the member including radially oriented recesses and being rotatable to (1) first position for alignment of the recesses with the slots permitting insertion and removal of the lamps, and (2) second position of dis-alignment of the recesses and slots whereby the lamps are locked in the base.

2. A device for holding a plurality of flash lamps each of which has an envelope part, a cap part, and current conductors, the device being securable to a camera which has first electrical contacts for energizing the lamps, the device comprising:
    (a) a base having upper and lower sides, an axis of rotation transverse to the sides, and a plurality of slots each extending radially inward from the outer circumference of the base and into which one of said flash lamps is insertable with its envelope and cap respectively on the upper and lower sides of the base,
    (b) a reflector on the upper side for each lamp,
    (c) a central member on said lower side of the base for rotatably securing the device to the camera,
    (d) second contacts disposed as sets on said lower side adjacent each slot for resilient connection to each lamp when it is inserted in a slot,
    (e) third contacts disposed in sets around the central member, each set being connected to one set of said second contacts for one lamp and being successively connectible to said camera's first contacts, whereby the lamps are flashable in succession as the device is rotated; and
    (f) an annular member which generally surrounds the base and has recesses extending from its outer circumference radially inward, said annular member being rotatable selectively (1) to align the recesses and slots permitting insertion of lamps into the slots, and (2) to dis-align the recesses and slots for locking the lamps in the slots.

3. A holder as defined in claim 2 wherein each set of second contacts adjacent each slot comprises resilient tongues which are electrically insulated from each other and which extend generally in the longitudinal direction of the slot at least along the part of the length where they cooperate with the current conductors of a lamp to be inserted in the slot.

4. A holder as defined in claim 2 wherein the side walls of each slot are formed at least partially by said second electrical contacts electrically insulated from each other.

5. A holder as defined in claim 2 for use with lamps, each of which has a first shank portion and an axially spaced thinner portion, the holder further comprising a plate fixedly secured to the base and having slots which are aligned with and are narrower than those of the base, the width of the base and plate slots corresponding to the thicknesses of the lamp's two shank portions, whereby each lamp is insertable and axially locked its respective slots.

6. A holder as defined in claim 2 further comprising a cam rotatable about said base axis and having a surface for successively contacting lamps and ejecting them from their corresponding slots.

7. A holder as defined in claim 2 further comprising a cover of transparent material which is detachably secured on the base and which surrounds the parts of the holder disposed above the base portion and the space occupied by the flash lamps.

8. A holder as defined in claim 7 wherein at least the side walls of the cover are blue-colored.

References Cited

UNITED STATES PATENTS

| | | | |
|---|---|---|---|
| 3,096,025 | 7/1963 | Prochnow | 240—1.3 |
| 3,309,513 | 3/1967 | Aymar | 240—1.3 |
| 3,327,105 | 6/1967 | Kottler et al. | 240—1.3 |
| 3,350,551 | 10/1967 | Whitehead | 240—1.3 |
| 3,360,639 | 12/1967 | Waggershauser | 240—1.3 |

NORTON ANSHER, Primary Examiner

FRED L. BRAUN, Assistant Examiner

U.S. Cl. X.R.

95—11